UNITED STATES PATENT OFFICE.

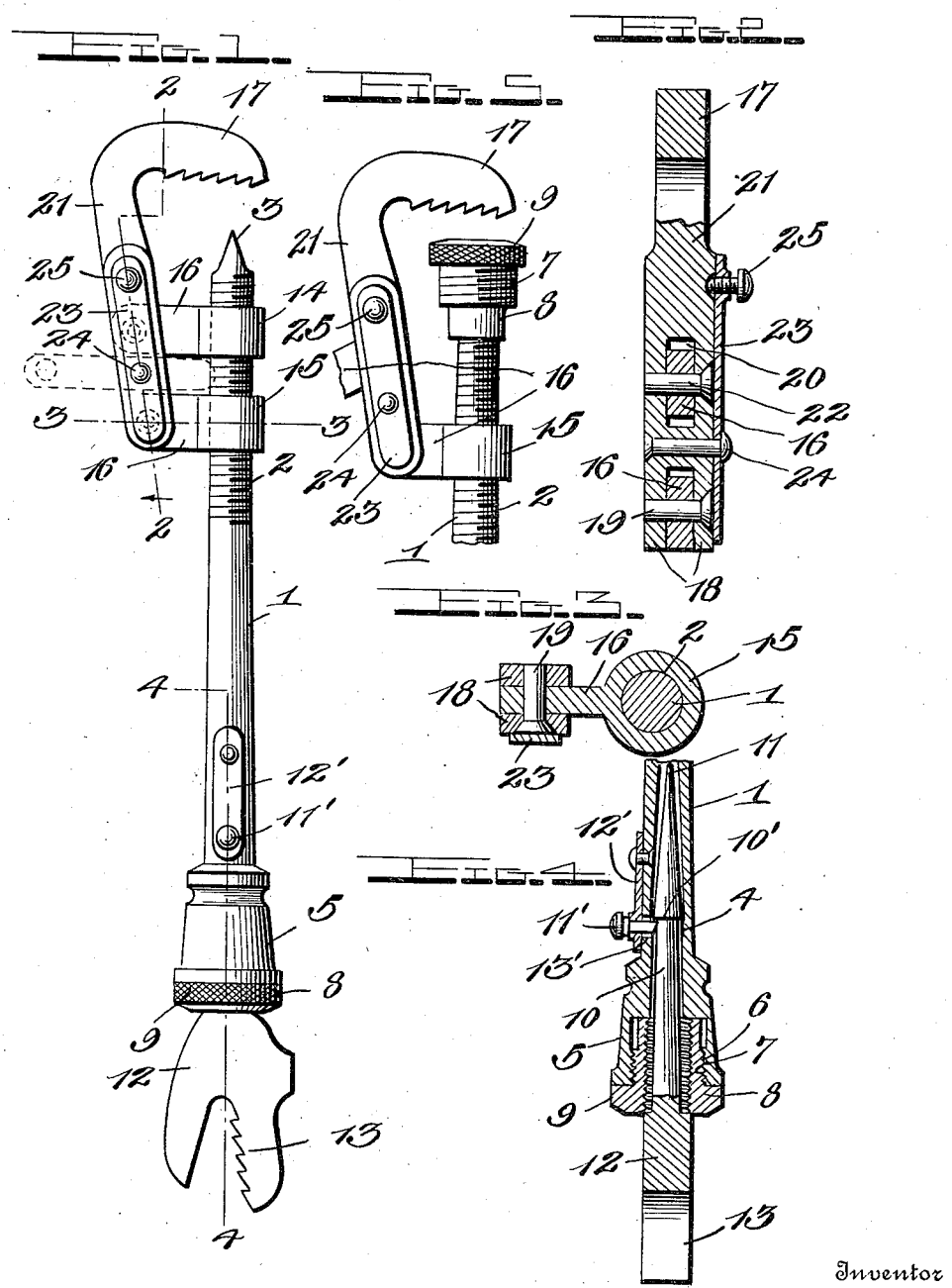

WASSIL SAVINKOFF, OF KAMSACK, SASKATCHEWAN, CANADA.

TOOL.

1,043,255. Specification of Letters Patent. Patented Nov. 5, 1912.

Application filed May 1, 1912. Serial No. 694,521.

*To all whom it may concern:*

Be it known that I, WASSIL SAVINKOFF, a subject of the King of England, residing at Kamsack, in the Province of Saskatchewan and Dominion of Canada, have invented certain new and useful Improvements in Tools, of which the following is a specification, reference being had to the accompanying drawings.

This invention relates to new and useful improvements in tools and more particularly to tools of the wrench type, the object of the invention being to provide a simple and durable tool of this character which is adapted for various applications.

Another object of the invention is to provide a tool of this character which will possess advantages in points of efficiency and durability, is inexpensive of manufacture and at the same time simple in construction and operation.

With the above and other objects in view the invention consists in the novel features of construction and in the arrangement and combination of parts hereinafter more fully described, pointed out in the claim, and shown in the accompanying drawings in which, Figure 1 is a side elevation of a tool constructed in accordance with my invention; Fig. 2 is a sectional view on the line 2—2 of Fig. 1; Fig. 3 is a sectional view on the line 3—3 of Fig. 1; Fig. 4 is a sectional view on the line 4—4 of Fig. 1; and Fig. 5 is a detail side elevation showing the tool adapted for use in setting tires on vehicle wheels or for other similar purposes.

Referring more particularly to the drawings 1, indicates the shank of the tool which is provided at one end with the exterior threads 2, the end of the shank tapering into a point 3 adapted for use as a screw driver or for holding bolts while the nuts are unscrewed therefrom. The other end of the shank is provided with a central bore 4, and having an enlarged portion 5 formed at the outer end of the shank, said enlarged portion being provided with the interior screw threads 6 adapted to co-act with the threads 7 formed on the outer surface of the thimble 8. The thimble 8 is provided on one end with an annular flange or head 9 adapted to abut against the end of the shank and to limit the inward movement of the thimble.

Disposed within the bore 4 is the tapering shank 10 which terminates at one end into a point 11 which may be used as a punch or for prying off plow shares or for any other desired purpose. Formed on the other end of the shank 10 is the enlarged head 12 bifurcated at its outer end to form the gripping jaws 13 which may be used for unscrewing pipes, nuts or various other similar articles. The shank 10 is provided with an annular shoulder 10' adapted to be engaged by the inner end of a spring held catch pin 11' to hold the shank 10 against outward movement when the same is inserted within the bore 4. The pin 11' is carried by the free end of the leaf spring 12' and adapted to be disposed through the opening 13' formed in the shank to engage with the shoulder 10'. Mounted upon the threaded end 2 of the shank are the spaced sleeves 14 and 15 each being provided with an outwardly extending arm 16, the arm on the outer sleeve 14 is to be slightly longer than the arm on the sleeve 15. A movable jaw 17 is provided having its lower end bifurcated to form the spaced arms 18 adapted to be arranged upon each side of the arm 16 formed on the sleeve 15 and held securely in place by means of the removable pin 19. An elongated slot 20 is formed in the shank of the jaw 17 and is adapted to receive the end of the arm 16 formed on the sleeve 14, said arm being held securely in place by means of the removable pin 22 which is disposed through the shank 21 and the end of the arm 16. The pins 19 and 22 are held securely in place by means of the resilient retaining plate 23 which is secured to the shank 21 by means of the rivet 24 which is disposed through the shank 21 at a point intermediate of the pins 19 and 22. It will be understood that the movable jaw 17 can be made of any suitable size and any length desired. This retaining plate 23 is adapted to swing to a transverse position as shown by the dotted lines in Fig. 1, to allow the removal or insertion of the pins 19 and 22, the plate being held in its normal position by means of the catch pin 25 having its end disposed in the recess 26 formed in the shank 21.

In Fig. 5 I have shown the tool so constructed that the same may be used for setting tires on vehicle wheels, the sleeve 14 being reversed to the opposite side of the shank of the jaw 17. The thimble 8 being removed from the end 5 of the shank 1, and threaded upon the pointed end 3, the head 9 forming a flat surface adapted to be engaged against the wood felly of the wheel to prevent injury thereto, the jaw 17 forming a hook adapted to be engaged over the edge of the tire whereby pressure upon the opposite end of the shank will serve to force the tire upon the outer periphery of the felly.

It will be understood that this tool may be used for various other purposes than those heretofore set forth in the present application and it will be seen that I have provided a simple and durable tool of the wrench type which is adapted for various applications.

While I have shown and described the preferred form of my invention it will be obvious that various changes in the details of construction and in the proportions may be resorted to for successfully carrying my invention into practice without sacrificing any of the novel features or departing from the scope thereof.

What I claim is:—

In a tool of the class described, the combination of a shank provided at one end with screw threads and terminating at its extreme end in a point, spaced sleeves mounted upon the threaded end of the shank, outwardly extending arms formed integral with said sleeves, a movable jaw having a shank formed integral therewith, said shank being mounted upon the outer ends of said arms, removable pins disposed through the shank and through the outer ends of the arms, a resilient retaining plate secured at its intermediate portion to one side of the shank at a point intermediate of the removable pins, and having its ends arranged over the pins to hold them in their respective positions, a catch pin carried by one end of the retaining plate and the shank of the jaw having a recess formed therein adapted to receive the end of said pin to hold the retaining plate in its normal position.

In testimony whereof I hereunto affix my signature in the presence of two witnesses.

WASSIL SAVINKOFF.

Witnesses:
JACOB KELMOCOFF,
ALEXER ANTIFAER.

---

Copies of this patent may be obtained for five cents each, by addressing the "Commissioner of Patents, Washington, D. C."